United States Patent

[11] 3,632,919

[72] Inventor  Francis J. Chatagnier
              5 East 13th Street, Antioch, Calif. 94509
[21] Appl. No. 29,801
[22] Filed     Apr. 20, 1970
[45] Patented  Jan. 4, 1972

[54] APPARATUS TO DETECT MATURE HEADS OF LETTUCE IN A CROP ROW
7 Claims, 7 Drawing Figs.
[52] U.S. Cl. .................................................. 200/61.42,
                                                      56/327 R
[51] Int. Cl. ..................................................... H01h 3/16
[50] Field of Search .......................................... 200/61.41,
              61.42, 61.13, 61.14; 56/327 R, DIG. 15

[56] References Cited
UNITED STATES PATENTS
3,380,237  4/1968  Garrett ........................  56/327 R
3,316,760  5/1967  Ward ..........................  200/61.41
3,212,245  10/1965  Miskiewicz ..................  56/DIG. 15

*Primary Examiner*—Robert K. Schaefer
*Assistant Examiner*—M. Ginsburg
*Attorney*—Webster & Webster ABSTRACT: An apparatus, to detect firm mature heads of lettuce in a crop row, comprising a mobile support movable along the row, and a support-mounted above-row vertically floatable detector unit bearing successively on the heads of lettuce as said support so moves; the detector unit including a gauge and detector wheel assembly.

INVENTOR
Francis J. Chatagnier
BY
Webster & Webster
ATTORNEYS

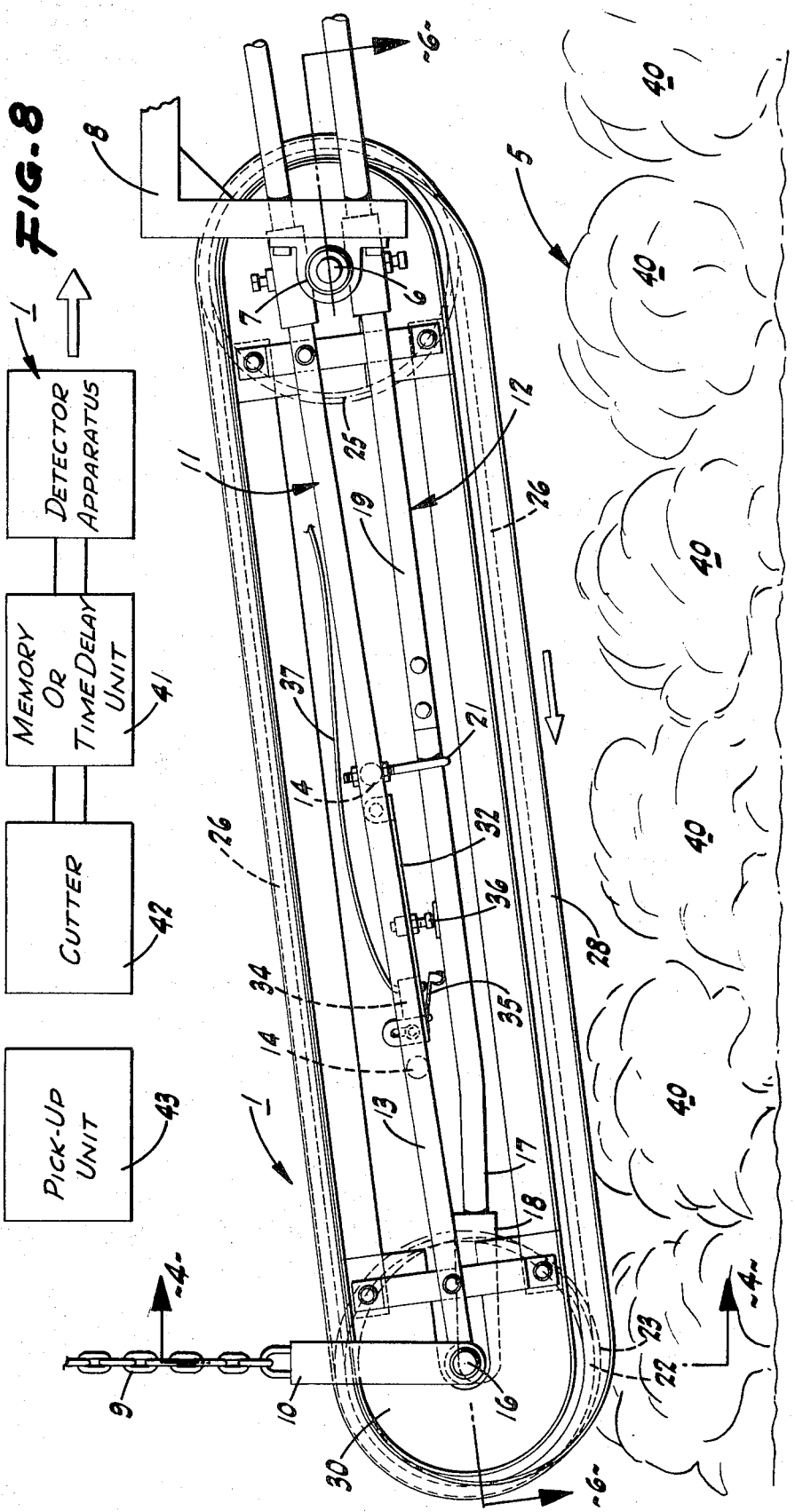

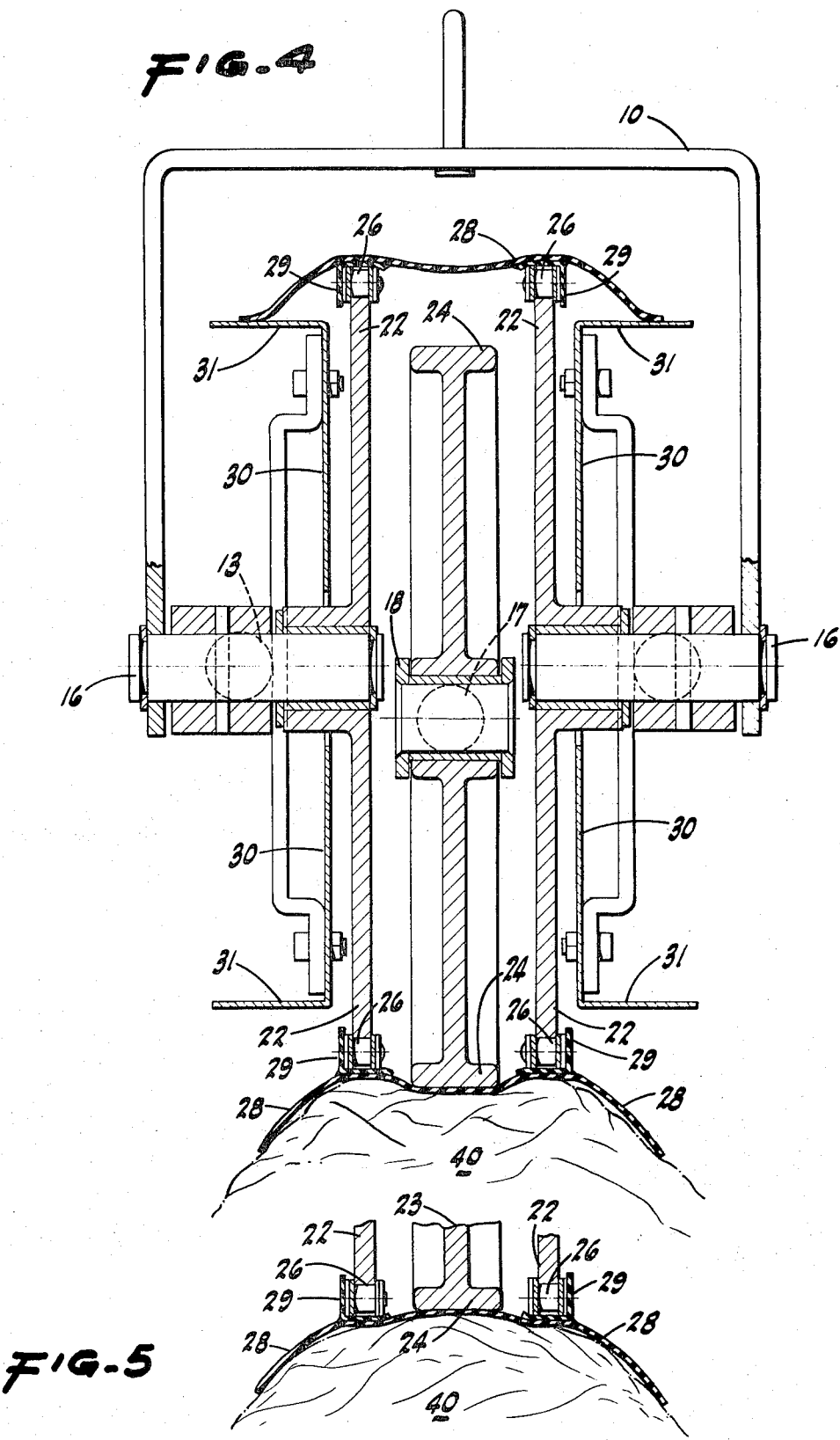

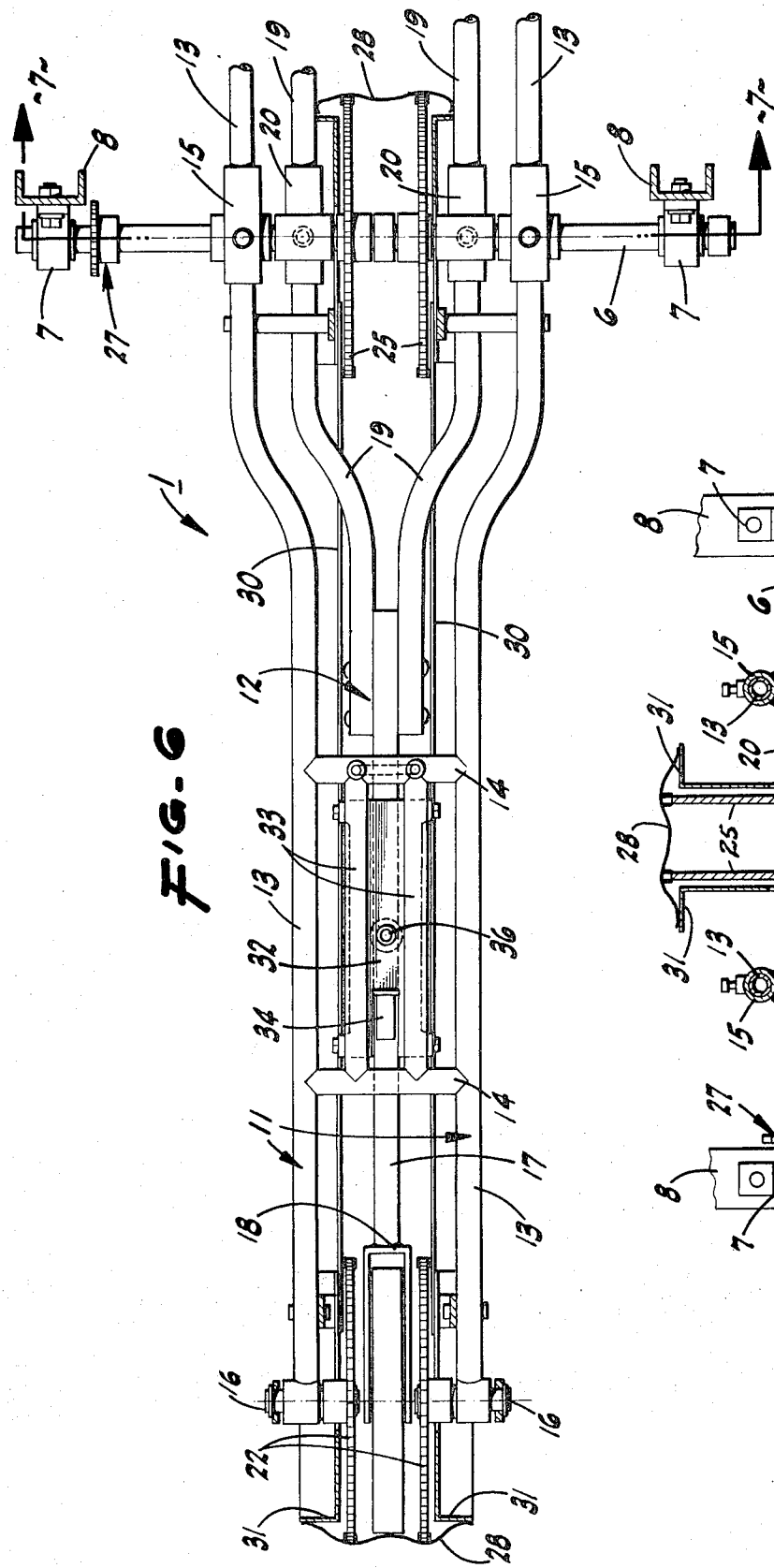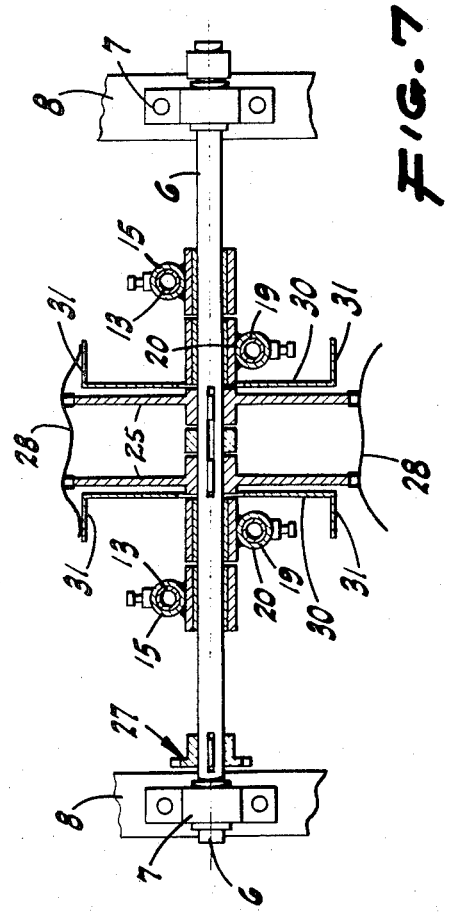

APPARATUS TO DETECT MATURE HEADS OF LETTUCE IN A CROP ROW

BACKGROUND OF THE INVENTION

In the development of mechanical harvesters for lettuce grown in crop rows, it is desired that the harvester be selective (i.e. operative on each pass along a crop row, and which is repeated every several days) to only harvest those heads of lettuce which are firm and mature, and to bypass—without damage—other heads of lettuce which are loose and immature. However, a problem exists in the accomplishment of accurate detection of the mature heads and the translation of such detection into a suitable response to control the harvester. The present invention was conceived in an effort to meet such problem.

SUMMARY OF THE INVENTION

The present invention provides, as an important object, an apparatus to detect firm mature heads of lettuce in a crop row, which apparatus—when mounted on a mobile support adapted for and traveling along a crop row—is operative to engage and advance along the crop row (without damage to the plants therein), detecting the firm mature heads of lettuce and translating such detection into a response which can be employed to control the harvester with which the present apparatus may be associated; the harvester forming no part of the present invention, and is not here shown.

The present invention provides, as another important object, an apparatus, as above, which comprises—on the mobile support and which may be a wheel-type tractor—a longitudinal frame assembly disposed above and inclining downwardly and rearwardly to a rear end termination adjacent the crop row; the frame assembly including separate longitudinal frames arranged for vertical floating relative to each other, a pair of transversely spaced gauge wheels journaled on and depending below one frame at its rear end, a detector wheel journaled on and depending below the other frame at its rear end between but in clearance relation to the gauge wheels, the detector wheel being raised a certain extent relative to the gauge wheels upon all such wheels passing onto and being supported by a firm mature head of lettuce in the crop row, and a control device (such as a switch) responsive to such raising of the detector wheel and attendant resultant movement of said other frame.

The present invention provides, as still another important object, an apparatus, as in the preceding paragraph, which—to prevent lettuce leaves from entangling with the gauge wheels and the detector wheel as the apparatus travels along a crop row—includes a driven, longitudinally extending, endless curtain which encircles the frame assebmly—including the aforesaid wheels thereon—from end to end thereof; such curtain being supported by means including the transversely spaced gauge wheels at the rear lower end of such frame assembly and other transversely spaced wheels at the front upper end thereof. Such endless curtain—which is of thin, very flexible but resilient material such as rubber sheeting—is driven so that its lower run travels at the ground speed of the mobile support but in the opposite direction so that, in effect, the curtain remains stationary above any given lettuce plant in the crop row. With the endless curtain disposed between the crop row and both the gauge wheels and the detector wheel, all such wheels are effectively protected against entanglement with lettuce leaves, and yet the detector wheel—due to the flexibility of the curtain, and on which the detector wheel rests—is permitted to rise and fall within the intended limits of its vertical movement.

The present invention provides, as a further object, an apparatus to detect mature heads of lettuce in a crop row, which is designed for ease and economy of manufacture, and ready installation on a mobile support such as a wheel-type tractor.

The present invention provides, as a still further object, a practical, reliable, and durable apparatus to detect mature heads of lettuce in a crop row, and one which is exceedingly effective for the purpose for which it is designed.

BRIEF DESCRIPTION OF THE DRAWINGS

FIG. 3 is an enlarged, fragmentary longitudinal elevation, taken substantially on line 3—3 of FIG. 1, showing details of the apparatus; the near guard plate being removed.

FIG. 4 is an enlarged, fragmentary transverse-sectional elevation, taken substantially on line 4—4 of FIG. 3, showing the detector wheel in the lowered position occupied thereby when the apparatus bears on a loose immature head of lettuce.

FIG. 5 is a view, similar to the lower portion of FIG. 4, showing the detector wheel in the raised position occupied thereby when the apparatus bears on a firm mature head of lettuce.

FIG. 6 is a sectional plan view taken substantially on line 6—6 of FIG. 3.

FIG. 7 is a transverse-sectional elevation taken substantially on line 7—7 of FIG. 6.

FIG. 8 is a diagrammatic illustration of a harvesting combination with which, for example, the present apparatus is adapted for use.

DESCRIPTION OF THE PREFERRED EMBODIMENT

Figure 1:
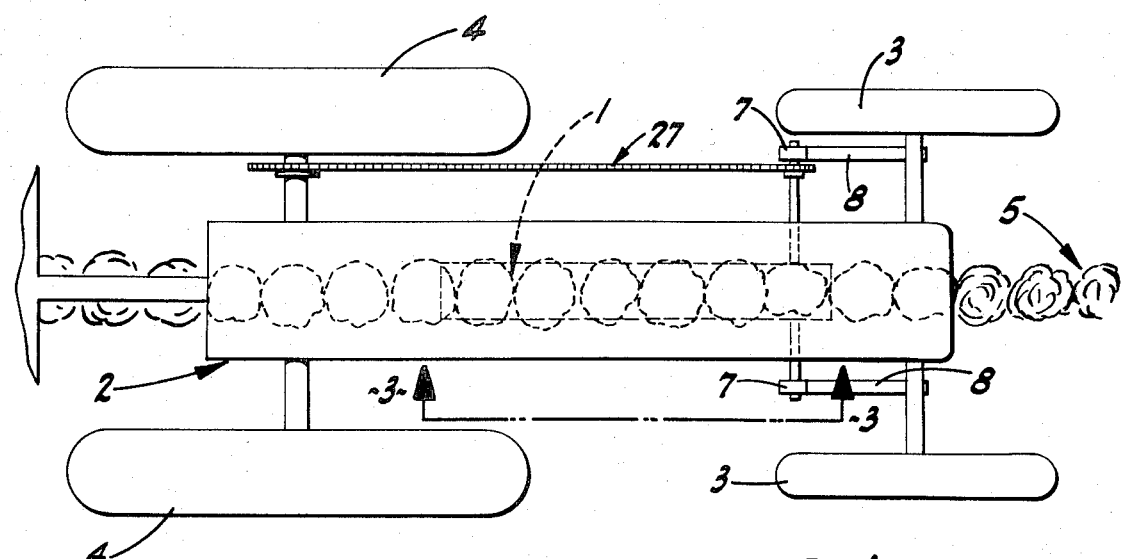
FIG. 1 is a plan view, mainly in outline, showing the apparatus as mounted on a wheel-type tractor and working along a crop row of lettuce.
Figure 2:
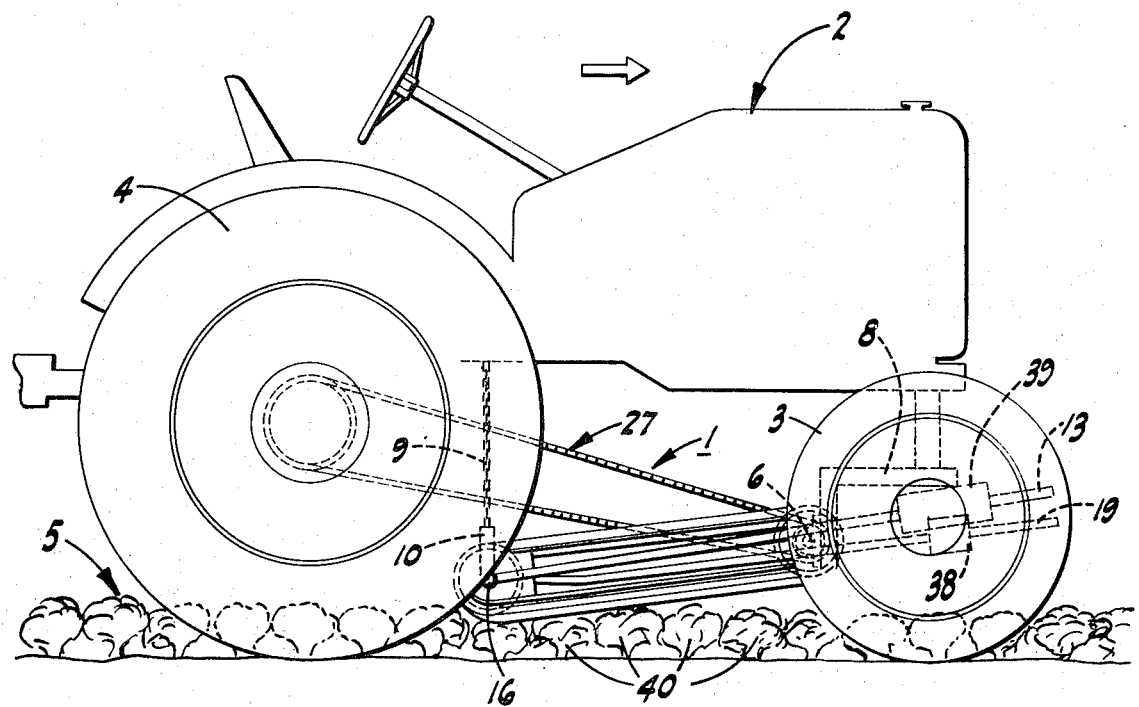
FIG. 2 is a side elevation of the same.

Referring now more particularly to the drawings and to the characters of reference marked thereon, the detecting apparatus of the present invention is indicated generally at 1; such apparatus being shown here (see FIGS. 1 and 2) as mounted on a wheel-type tractor 2 in a suspended position beneath the chassis thereof and between the front wheels 3 and rear wheels 4; the apparatus 1 being elongated and extending lengthwise of the tractor in a position to directly overlie a crop row 5 of lettuce upon the tractor advancing in straddling relation to such row.

A horizontal cross shaft 6 is journaled, as at 7, on—and spans between—rigid, transversely spaced brackets 8 fixed on the chassis of the tractor; such cross-shaft 6 being disposed beneath the forward end of the tractor and some distance aboveground. The apparatus 1 is connected to and trails—in floating relation—behind the cross-shaft 6 at a downward and rearward incline; the extent of downward motion of said apparatus 1 being limited by a suspension chain 9 connected by a yoke 10 between the rear end of such apparatus and a point thereabove on the chassis of the tractor 2.

The structure of the apparatus 1 is comprised of a frame assembly including one longitudinal frame indicated generally at 11, and another longitudinal frame indicated generally at 12; such frames 11 and 12 being separately attached adjacent their forward ends to the cross-shaft 6 for independent floating motion; all as will be described hereinafter.

The frame 11 is comprised of a pair of transversely spaced, longitudinal rods 13 connected together in rigid relation at a point intermediate their ends by spanner bars 14; the forward end portions of the rods 13 (which portions are increased in their transverse spacing) being adjustably secured in attachment sleeves 15 journaled on the cross-shaft 6. The rear ends of the rods 13 have transverse stub shafts 16 thereon, and to the outer ends of which the yoke 10 is attached.

The frame 12 is comprised of a rearward, central longitudinal rod 17 formed with a fork 18 on its rear end, and forward transversely spaced rods 19 adjustably secured in attachment sleeves 20 journaled on the cross-shaft 6.

As so constructed and attached to the cross-shaft 6, each of the frames 11 and 12 is capable of independent vertical floating motion about such shaft as an axis; the chain 9 limiting downward motion of frame 11, while downward motion of frame 12 is limited by a cradlelike stop 21 mounted on the rods 13 and extending below the rod 17.

At the rear end thereof, each rod 13 carries, on the inner end portion of the related stub shaft 16, a rotatable gauge wheel 22 of substantial diameter. As the stub shafts 16 terminate short of each other, there is a clear space between the gauge wheels 22; the fork 18 on rod 17 occupying such space and a detector wheel 23 is journaled in such fork and thus lies between said gauge wheels 22. The detector wheel 23 has a wide flat rim 24 which, at the bottom, is normally disposed slightly below the bottom of the gauge wheels 22. See FIG. 4.

The gauge wheels 22 are actually sprocket wheels, and corresponding, transversely spaced sprocket wheels 25 are fixed on and driven by the cross-shaft 6. Endless chains 26 extend between and are trained in meshing relation about corresponding wheels 22 and 25 whereby all such wheels are driven from the cross-shaft 6; the latter being driven from one rear wheel 4 of the tractor by an endless chain and sprocket unit 27.

An endless, relatively wide curtain 28 of thin, flexible and resilient material (such as sheet rubber) extends longitudinally and encircles the assembly of frames 11 and 12 (including the wheels 22 and 25, and the endless chains 26), and laterally inwardly of its side edges is vulcanized, as at 29, to such endless chains 26 for travel therewith; the lower run of said endless curtain 28 moving in a rearward direction and at a speed equal but opposite to the ground speed of the tractor.

On each side thereof, the frame assembly is provided with a longitudinal, substantially full-length, vertical guard plate 30 disposed adjacent but outwardly of the corresponding wheels 22 and 25; each guard plate 30 including, at its outer edge, a lateral flange 31 which extends straight between such wheels but at related ends is curved symmetrical to said wheels. The guard plates 30 minimize access of lettuce leaves and other debris into the apparatus from the sides, and additionally the flanges 31 preclude the side edge portions of the relatively wide endless curtain 28 from folding back into the frame assembly or catching between the wheels 22 and 25 and the chains 26 trained thereabout.

A plate 32 is vertically adjustably mounted in connection with fixed, transversely spaced, lengthwise arms 33 which extend between the spanner bars 14 of frame 11; the plate 32 being fitted with a microswitch 34 having a downwardly inclined trigger finger 35 adapted to be engaged and moved upward (to actuate the switch) by the rod 17 upon upward motion or raising of detector wheel 23 relative to gauge wheels 22. An adjustable stop 36 on plate 32 prevents the rod 17 from moving upward a distance such that the trigger finger 35 and the switch 34 would be damaged. The switch 34 is provided with flexible circuit wires 37.

The rods 13 of frame 11, and the rods 19 of frame 12, project some distance ahead of the cross-shaft 6, and the projecting portions of such rods are each fitted with longitudinally adjustable counterweights 38 and 39. See FIG. 2.

In operation of the described apparatus 1, it extends—in floating relation—from the cross-shaft 6 at a rearward and downward incline, and at the lower end portion passes in gentle engagement, successively, with the heads 40 of the lettuce plants in the crop row 5; the force of engagement, which is insufficient to damage such heads 40, is regulated by adjustment of the counterweights 38 and 39. The chain 9 is normally slightly slack but does serve to limit downward movement of the rear end of the apparatus. Further, as the lower run of the endless curtain 28 moves rearwardly at ground speed of the apparatus as the latter advances, there is not, in effect, any relative motion between any lettuce head 40 on which the curtain may rest.

As the lower end portion of the apparatus passes onto each lettuce head 40, the gauge wheels 22 and the detector wheel 23 seat, in effect, on such head even though the thin, flexible and resilient curtain 28 lies—in protective relation—between such wheels and lettuce head. The detector wheel is vertically positioned by substantially the top center of each lettuce head, and the gauge wheels are vertically positioned by the top of each lettuce head laterally outwardly from said detector wheel; said control device being responsive to predetermined upward movement of the detector wheel relative to the gauge wheels. If the lettuce head 40 is loose and immature, the gauge wheels 22 and the detector wheel 23 remain in their initial relative positions with the detector wheel depending slightly below the gauge wheels. See FIG. 4. However, if the lettuce head 40 is firm and mature, the detector wheel 23 is caused (by the hard crown of the head) to move upward a short distance relative to the gauge wheels 22, and this results in the rod 17 likewise moving upward and closing the switch 34. See FIG. 5. In either instance, the gauge wheels 22, and the part of the curtain 28 therebetween, cause the lower portion of the apparatus to rise and fall an amount dependent on the size of the lettuce head which is engaged.

Upon the switch 34 being actuated by the apparatus detecting a firm mature lettuce head 40, as above described, such switch causes a response in a memory or time-delay unit 41 which in turn (after a pause predetermined by the ground speed of the tractor) actuates a trailing power cutter 42 (on the tractor or a trailer) which at the proper moment acts and severs the detected lettuce head 40 from its root. Thereafter, such severed lettuce head is gathered by a pickup unit 43. Except for the switch 34, all that which is described in this paragraph—and constituting a harvesting mechanism—is not a part of the present invention and is merely shown diagrammatically in FIG. 8 by way of example.

From the foregoing description, it will be readily seen that there has been produced such an apparatus to detect mature heads of lettuce in a crop row as substantially fulfills the objects of the invention, as set forth herein.

While the detecting apparatus, of the present invention, is especially designed for use with a lettuce crop, such apparatus is adaptable for use with other crops—such as cabbage, cauliflower, or the like—having, when mature, firm heads.

While this specification sets forth in detail the present and preferred construction of the apparatus to detect mature heads of lettuce in a crop row, still in practice such deviations from such detail may be resorted to as do not form a departure from the spirit of the invention, as defined by the appended claims.

I claim:

1. In an apparatus, to detect firm mature heads of lettuce in a crop row, comprising a mobile support adapted for travel along the row, a support-mounted above-row vertically floatable detector unit bearing downwardly and successively on the heads of lettuce as said mobile support so travels, and a control device responsive to the detector unit; the improvement characterized by the detector unit including a pair of independently vertically floatable frames, transversely spaced gauged wheels journaled in axial alignment on one frame, and a detector wheel journaled on the other frame between and in clearance relation to the gauge wheels, the detector wheel being vertically positioned by substantially the top center of each lettuce head, and the gauge wheels being vertically positioned by the top of each lettuce head laterally outwardly from said detector wheel; said control device being responsive to predetermined upward movement of the detector wheel relative to the gauge wheels.

2. An apparatus, as in claim 1, in which the detector unit additionally includes a driven endless curtain mounted in connection with the support and extending lengthwise of the crop row, such endless curtain having a lower run engaging in part on the crop row, and means to drive the endless curtain so that its lower run travels at substantially ground speed of the support but in the opposite direction; the endless curtain being flexible and turning at one end about the gauge wheels and the detector wheel; the detector wheel being moved upwardly upon corresponding upward deflection of the curtain, by a curtain-engaged lettuce head, at a point immediately below said detector wheel.

3. An apparatus, as in claim 1, in which the detector unit additionally includes a cross shaft on the support; the vertically floatable frames being journaled on the cross-shaft and trailing therefrom in adjacent relation at a downward and rearward slope, the gauge wheels and the detector wheel being journaled on the rear lower ends of the corresponding frames.

4. An apparatus, as in claim 3, including another pair of transversely spaced wheels fixed on the cross-shaft in alignment with the gauge wheels, a flexible endless curtain trained about and extending between said pairs of wheels, and means to drive the cross-shaft in a direction and at a speed such that the lower run of the curtain travels at ground speed but in the opposite direction; the detector wheel riding the endless curtain between the gauge wheels and being moved upwardly upon corresponding upwardly deflection of said endless curtain, by a curtain-engaged lettuce head, at a point immediately below said detector wheel.

5. An apparatus, as in claim 4, in which both pairs of wheels are formed as sprocket wheels, endless chains extending between and trained about corresponding ones of such sprocket wheels, and the flexible endless curtain embracing said endless chains and being secured thereto.

6. An apparatus, as in claim 4, including transversely spaced, longitudinally extending, vertical guard plates disposed with said pair of frames therebetween, and laterally outwardly projecting flanges on the upper and lower edges of the guard plates; the curtain being of a width such that the side edge portions thereof lap the corresponding flanges.

7. An apparatus, as in claim 1, in which the control device is an electric switch; there being means mounting the switch on said one frame in position for engagement and actuation by the other frame upon upward movement thereof relative to such one frame and in response to said predetermined upward movement of the detector wheel.

* * * * *